(12) United States Patent
Shen

(10) Patent No.: US 9,467,764 B2
(45) Date of Patent: Oct. 11, 2016

(54) WIRE ORGANIZER

(71) Applicant: Wen Hong Shen, Taipei (TW)

(72) Inventor: Wen Hong Shen, Taipei (TW)

( * ) Notice: Subject to any disclaimer, the term of this patent is extended or adjusted under 35 U.S.C. 154(b) by 0 days.

(21) Appl. No.: 14/121,072

(22) Filed: Jul. 28, 2014

(65) Prior Publication Data

US 2016/0029113 A1 Jan. 28, 2016

(51) Int. Cl.
*H04R 1/10* (2006.01)
*H02G 3/32* (2006.01)

(52) U.S. Cl.
CPC .............. *H04R 1/1033* (2013.01); *H02G 3/32* (2013.01); *H04R 1/1016* (2013.01)

(58) Field of Classification Search
CPC .......... H01R 1/1033; H02G 3/32; F16B 2/22
See application file for complete search history.

(56) References Cited

U.S. PATENT DOCUMENTS

| | | | | |
|---|---|---|---|---|
| 8,605,933 B2* | 12/2013 | Massey | ................ | H04R 1/1033 381/370 |
| 2002/0129471 A1* | 9/2002 | Wang | ....................... | H02G 3/30 24/601.2 |
| 2008/0121763 A1* | 5/2008 | Mori | ....................... | H02G 3/32 248/68.1 |
| 2008/0285785 A1* | 11/2008 | Zieg | ....................... | H04R 5/023 381/370 |
| 2010/0038199 A1* | 2/2010 | Wengreen | .............. | H02G 11/02 191/12 R |
| 2010/0150370 A1* | 6/2010 | Bales | ................... | H04R 1/1033 381/74 |
| 2012/0170790 A1* | 7/2012 | Pang | .................... | H04R 1/1033 381/384 |
| 2012/0192925 A1* | 8/2012 | Grushkowitz | ............ | F16L 3/24 136/251 |
| 2013/0202146 A1* | 8/2013 | Xue | ...................... | H04R 1/1033 381/384 |
| 2014/0138498 A1* | 5/2014 | Stango, Jr. | ................ | H02G 3/32 248/74.4 |
| 2014/0169610 A1* | 6/2014 | Pang | .................... | H04R 1/1033 381/384 |
| 2015/0152981 A1* | 6/2015 | Goodall | ................. | A44B 99/00 24/303 |
| 2015/0163580 A1* | 6/2015 | Wallaja | ................ | H04R 1/1033 381/384 |

* cited by examiner

*Primary Examiner* — Matthew Eason
(74) *Attorney, Agent, or Firm* — Jackson IPG PLLC; Demian K. Jackson

(57) ABSTRACT

A wire organizer for use in an in-ear earphone set is disclosed to include a wire clip body made of an elastic plastic material and having a small through hole and a large through hole cut longitudinally through the wire clip body in a parallel manner, a side opening transversely cut through one sidewall of the wire clip body in communication with the small through hole, and a plurality of chamfered edges located at border areas of the wire clip body around the small through hole.

7 Claims, 1 Drawing Sheet

WIRE ORGANIZER

BACKGROUND OF THE INVENTION

1. Field of the Invention

The present invention relates to in-ear earphone technology and more particularly, to a wire organizer, which is conveniently in use in an in-ear earphone set for holding an electrical wire in an organized condition to shorten the length.

2. Description of the Related Art

In-ear earphone sets are widely used with mobile multimedia devices. The electrical wires of in-ear earphone set commonly have a certain length. When putting the earphones of an in-ear earphone set in the ears, the electrical wires of the in-ear earphone set may be suspended in air. The suspended electrical wires can be stretched accidentally to pull the ear phones out of the user's ears. Further, suspending the electrical wires in air can obstruct the sense of beauty. Therefore, it is a strong demand for a wire organizer for use in an in-ear earphone set to hold the electrical wires in an arranged condition.

SUMMARY OF THE INVENTION

The present invention has been accomplished under the circumstances in view. It is one object of the present invention to provide a wire organizer for in-ear earphone set, which is conveniently in use in an in-ear earphone set for holding an electrical wire in an organized condition to shorten the length.

To achieve this and other objects of the present invention, a wire organizer comprises a wire clip body made of an elastic plastic material and having a small through hole and a large through hole cut longitudinally through the wire clip body in a parallel manner, a side opening transversely cut through one sidewall of the wire clip body in communication with the small through hole, and a plurality of chamfered edges located at border areas of the wire clip body around the small through hole. Further, the height of the large through hole is about twice the height of the small through hole.

DETAILED DESCRIPTION OF THE PREFERRED EMBODIMENT

Figure 2:
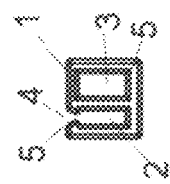
FIG. 2 is a side view of the wire organizer for in-ear earphone set in accordance with the present invention.
Figure 1:
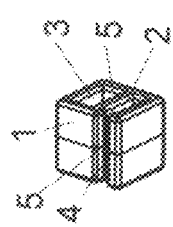
FIG. 1 is an oblique elevational view of a wire organizer for in-ear earphone set in accordance with the present invention.

Referring to FIGS. 1 and 2, a wire organizer for in-ear earphone set in accordance with the present invention is shown. The wire organizer comprises a wire clip body 1 made of an elastic plastic material, a small through hole 2 and a large through hole 3 longitudinally extending through opposing front and rear ends of the wire clip body 1 in a parallel manner, a side opening 4 transversely cut through one sidewall of the wire clip body 1 in communication with the small through hole 2, and a plurality of chamfered edges 5 located at border areas of the wire clip body 1 around the small through hole 2, the large through hole 3 and the side opening 4. Further, the small through hole 2 and the large through hole 3 each define a respective height. The height of the large through hole 3 is about twice the height of the small through hole 2.

Figure 3:
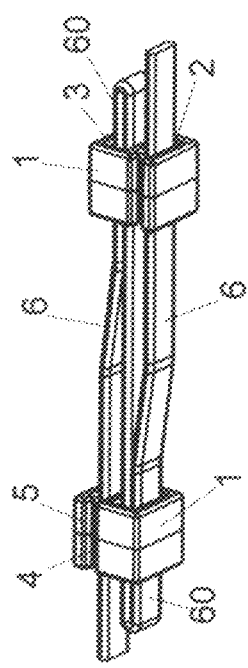
FIG. 3 is an applied view of the present invention, illustrating an electrical wire arranged in two wire organizers in an organized condition.

Referring to FIG. 3, when using the wire organizer to hold an electrical wire 6, fold up a middle part of the electrical wire 6 into a folded part 60, and then insert the folded part 60 of the electrical wire 6 into the large through hole 3 in the wire clip body 1, and then force the end piece of the electrical wire 6 through the side opening 4 into the small through hole 2 in the wire clip body 1. Thus, the wire organizer can be used to hold the electrical wire 6 in an arranged condition, shortening wire length.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A wire organizer, comprising a wire clip body made of an elastic plastic material, a small through hole and a large through hole longitudinally extending through opposing front and rear ends of said wire clip body in a parallel manner and wherein the small and large through holes are each rectangular in cross-section, a side opening transversely cut through one sidewall of the small through hole and wherein the large through hole is defined by continuous sidewalls, and a plurality of chamfered edges located at border areas of said wire clip body around said small through hole, said large through hole and said side opening, said small through hole and said large through hole each defining a respective height, the height of said large through hole being about twice the height of said small through hole,
wherein the large through hole is configured for insertion of a single folded flat wire and wherein the side opening and small through hole are configured such that a single layer of the flat wire defining an end piece can be forced through the side opening and into the small through hole.

2. The wire organizer of claim 1, wherein at least one of the small and large through holes is not substantially square in cross-section.

3. The wire organizer of claim 1, wherein the wire clip body has a substantially square outer cross-sectional shape.

4. An adjustable length wire assembly comprising
at least one wire clip body made of an elastic plastic material and with a small through hole and a large through hole each longitudinally extending through opposing front and rear ends of the wire clip body in a parallel manner and wherein the small and large through holes are each rectangular in cross-section, a side opening transversely cut through one sidewall of the small through hole wherein the large through hole is defined by continuous sidewalls, and a plurality of chamfered edges located at border areas of the wire clip body around the small through hole, the large through hole and the side opening and
a flat wire, wherein the flat wire is single folded and inserted into the large through hole and a single layer of the flat wire defining a first end piece is forced through the side opening and into the small through hole.

5. The wire assembly of claim 4, wherein at least one of the small and large through holes is not substantially square in cross-section.

6. The wire organizer of claim 4, wherein the wire clip body has a substantially square outer cross-sectional shape.

7. The wire assembly of claim 4, comprising two wire clip bodies and wherein the flat wire is double folded into two overlapping single folds and wherein a first single fold is inserted into the large through hole of a first wire clip body and a single layer of the flat wire defining the first end piece is forced through the side opening and into the small through hole of the first wire clip body and wherein a second single fold is inserted into the large through hole of a second wire clip body and a single layer of the flat wire defining a second end piece is forced through the side opening and into the small through hole of the second wire clip body.

* * * * *